US011341232B2

(12) United States Patent
Stohr et al.

(10) Patent No.: US 11,341,232 B2
(45) Date of Patent: May 24, 2022

(54) SMART CARD AS A SECURITY TOKEN

(71) Applicant: GIESECKE+DEVRIENT MOBILE SECURITY GMBH, Munich (DE)

(72) Inventors: Volker Stohr, Munich (DE); Frank-Michael Kamm, Holzkirchen (DE); Nils Gerhardt, Munich (DE); Andreas Chalupar, Munich (DE)

(73) Assignee: GIESECKE+DEVRIENT MOBILE SECURITY GMBH, Munich (DE)

( * ) Notice: Subject to any disclaimer, the term of this patent is extended or adjusted under 35 U.S.C. 154(b) by 28 days.

(21) Appl. No.: 17/251,622

(22) PCT Filed: Jun. 18, 2019

(86) PCT No.: PCT/EP2019/000191
§ 371 (c)(1),
(2) Date: Dec. 11, 2020

(87) PCT Pub. No.: WO2020/001807
PCT Pub. Date: Jan. 2, 2020

(65) Prior Publication Data
US 2021/0110027 A1 Apr. 15, 2021

(30) Foreign Application Priority Data
Jun. 25, 2018 (DE) .................... 10 2018 005 038.7

(51) Int. Cl.
*H04L 9/08* (2006.01)
*H04L 9/32* (2006.01)
(Continued)

(52) U.S. Cl.
CPC ............. *G06F 21/45* (2013.01); *G06Q 20/34* (2013.01); *G06Q 20/385* (2013.01);
(Continued)

(58) Field of Classification Search
CPC ...... G06F 21/45; G06Q 20/34; G06Q 20/341; H04L 9/3228; H04L 9/3234; H04L 9/3271; H04W 12/06
See application file for complete search history.

(56) References Cited

U.S. PATENT DOCUMENTS 6,327,578 B1 12/2001 Linehan
6,367,013 B1 4/2002 Bisbee et al.
(Continued)

FOREIGN PATENT DOCUMENTS

DE 60023340 T2 7/2006
DE 102012111481 B4 2/2017
WO 2009025905 A2 2/2009

OTHER PUBLICATIONS

"3rd Generation Partnership Project; Technical Specification Group Services and System Aspects; 3GPP System Architecture Evolution (SAE); Security Architecture (Release 15)," 3GPP: A Global Initiative, V15.2.0, Jan. 4, 2018, 164 Pages.
(Continued)

*Primary Examiner* — Izunna Okeke
(74) *Attorney, Agent, or Firm* — Workman Nydegger

(57) ABSTRACT

The present invention relates to a method for making available a security key, wherein a smart card adapted according to the invention is employed for the production thereof. In this case, an expedient method sequence is proposed which makes it possible for the smart card to make available, for example, a so-called one-time password or a dynamic check number in interaction with a token server. The present invention further relates to a correspondingly adapted computing arrangement and to a computer program product with control commands which implement the method and/or operate the computing arrangement.

13 Claims, 4 Drawing Sheets

(51) Int. Cl.
    *G06F 21/45*    (2013.01)
    *G06Q 20/34*    (2012.01)
    *G06Q 20/38*    (2012.01)
    *G06Q 20/40*    (2012.01)

(52) U.S. Cl.
    CPC ....... *G06Q 20/4018* (2013.01); *H04L 9/3228* (2013.01); *H04L 9/3234* (2013.01); *H04L 9/3271* (2013.01)

(56) References Cited

U.S. PATENT DOCUMENTS

| | | |
|---|---|---|
| 8,572,394 B2 | 10/2013 | Hird et al. |
| 2012/0308011 A1* | 12/2012 | Chencinski .......... H04L 9/0894 380/278 |
| 2016/0309323 A1 | 10/2016 | Zarakas et al. |

OTHER PUBLICATIONS

Search Report and Written Opinion from DE Application No. DE102018005038.7, dated Apr. 1, 2019.
International Search Report and Written Opinion from PCT Application No. PCT/EP2019/000191, dated Aug. 1, 2019.

* cited by examiner

SMART CARD AS A SECURITY TOKEN

BACKGROUND

The present invention is directed to a method for making available a security key, wherein a smart card adapted according to the invention is employed to produce it. Here, an expedient method sequence is proposed which enables the smart card to make available, for example, a so-called one-time password or a dynamic check number in cooperation with a token server. The invention is further directed to a correspondingly adapted computing arrangement and to a computer program product with control commands which implement the method and/or operate the computing arrangement.

DE 10 2012 111 481 B4 shows a method for controlling the installation of an application on a mobile end device with a token provider installed on the mobile end device, which knows the network address of a token server.

DE 600 23 340 T2 shows a photographic system which employs a token server among other things.

It is generally known in the context of payment services that a user authenticates himself by means of a password and can then carry out a financial transaction. In this context, so-called web services are made available online, which enable payment. In the real world, terminals are also known where customers can pay with their smart card, for example. Online-based methods have the disadvantage that in a so-called man-in-the-middle attack a communication between a paying entity and a receiving entity can be eavesdropped and then played back again. An unauthorized third party could thus play back the payment process that was previously observed, and an unauthorized transaction is thus carried out by means of the password. In order to counter this disadvantage, so-called one-time passwords (OTP) are known, i.e. one-off passwords which become invalid immediately after use. An unauthorized playback is thus recognized and the transaction is then not executed.

Further, check numbers are known that are intended to ensure that the user has the card for a transaction. For this purpose, the state of the art knows so-called card verification codes (CVC), i.e. a predetermined card number that can be found on the back side of a credit card. However, such check numbers are visible to all, including unauthorized, card holders, and are thus insecure. This disadvantage has been remedied in the state of the art by proposing display cards, i.e. say smart cards which are equipped with a display and which dynamically compute a check number at runtime. For this purpose, in addition to the display the display card also has electronic components ready which carry out corresponding computing steps.

Mobile telephones are increasingly being used for payment services, since these have the necessary computing capacity and communication interfaces. For example, different interfaces are known in mobile telephones, wherein so-called near field communication NFC is increasingly being used.

A general distinction is made between software-based methods and hardware-based methods when producing security-relevant keys or effecting authorization. A brief overview of known methods is therefore given below.

Software-based methods: the security of software-based methods is generally not very high, since the secret "seed" value that is required to compute the OTP/CVC cannot be securely protected in software. An attacker who is able to extract the seed value can use it to produce valid OTP/CVC.

Hardware-based methods: with these methods, the protection of the seed value is generally given, but the corresponding hardware tokens or reading devices are quite expensive. For issuers with a large user base (e.g. banks, industrial companies) this results in high additional costs. For end users, there results the requirement to have the token available. Especially for mobile applications (transactions in mobile banking) this is very inconvenient and often not the case in practice. The methods with special reading devices (MasterCard CAP, VISA DPA) also always require the involvement of the card issuer, since the verification of the OTP can only be carried out with secret keys that only the issuer holds. The method cannot easily be carried out on mobile telephones either (without a special reader), since the secret card PIN must be employed and can potentially be spied on. In addition, OTPs cannot be generated for different web services (relying parties).

Proceeding from the disadvantages, as discussed i.a. in the context of the software-based methods or hardware-based methods, there is generally a need for an improved method which ensures that security keys can be produced in a particularly simple manner and that additionally no unnecessary hardware is employed, which would have to be purchased by the customer first. Such additional hardware would reduce user acceptance and thus make the corresponding method appear disadvantageous.

SUMMARY

It is thus an object of the present invention to make available an improved method for making available a security key while employing a smart card and a token server which allows the security key to be made available both securely and easily. Further, it is an object of the present invention to propose a correspondingly adapted computing arrangement and a computer program product with control commands which implement the method and/or operate the computing arrangement.

Accordingly, a method for making available a security key while employing a smart card as security token and a token server is proposed, comprising transmitting a random challenge message produced by the token server via an, in particular secured, data connection from the token server to an end device, forwarding the produced challenge message from the end device to the smart card, which causes at least one item of security information to be transmitted as a response message to the token server via the, in particular secured, data connection, the transmitted security information being checked by the token server and, if the check is positive, producing a symmetric key in dependence on the transmitted security information, computing a security key in dependence on the produced symmetric key and making available the computed security key by means of the, in particular secured, data connection from the token server to the end device. The symmetric key can also be referred to as a secret key. The security key can also be referred to as a security code or security check number.

The person skilled in the art recognizes here that individual method steps can be carried out iteratively and/or can have substeps. For example, messages can be transmitted iteratively in such a manner that partial messages are sent and individual data packets, for example, are sent network-technically. The checking, producing and computing can also have several substeps.

The state of the art employs different abbreviations, which are to be understood as provided by the state of the art also in the context of the present invention. CVC stands for Card Validation Code or a check number. PAN is understood to be the so-called Primary Account Number, which identifies the card issuer and the card holder's account. In the context of authentication, different algorithms are known which employ concepts such as DDA, SDA and CDA. These are abbreviations for Dynamic Data Authentication (DDA), Static Data Authentication (SDA) or Combined Data Authentication (CDA).

Generally, a token serves as a hardware component to identify and authenticate a user who is the legal owner of this token. Both software tokens and hardware tokens are known here. The person skilled in the art understands EMV as a specification for payment cards, which is named after the companies of the corresponding consortium, namely Europay International, MasterCard and VISA. HSM refers to a so-called hardware security module, which is typically employed as an internal or external peripheral device for the secure storage of cryptographic keys and the efficient and secure execution of cryptographic operations or applications.

With the invention, an already existing and personalized security token, for example a smart card, can be made usable to produce a one-time password OTP, e.g. for the login to a web service or the authorization of a transaction, or a dynamic CVC for an e-commerce transaction. The existing token does not have to be modified for this purpose. It serves as a hardware anchor for the secure production of a one-time password or a check number.

Since smart cards that have already been issued do not have the universal abilities to dynamically produce a one-time password or a CVC check number, a token server is introduced to take over the authentication of the card and the derivation of the secret seed value (symmetric key/symmetric secret). While an asymmetric key can be derived according to the prior art and a server challenge is signed with it, it is advantageous in the present invention to derive a symmetric secret, in the computation of which further external data can possibly be considered, such as for example transaction data or time-dependent random data. For verification on the part of the web service, this seed value must also be securely exported.

The method comprises various method steps, which can be represented in different granularities. In the following, an exemplary embodiment is described which has several steps, which can also be combined. In this context it can also be possible to insert further substeps. In the following, the making available of the security key is demonstrated, which can be present in the form of a so-called one-time password OTP or of a check number CVC.

The method for OTP/CVC generation is based, according to one aspect of the present invention, on the following steps:

Step 1: Between end-user device (e.g. mobile telephone) and token server a, particularly secured, connection or data connection is set up. This can be effected on the basis of existing and known methods according to the state of the art (e.g. TLS connection).

Step 2: The token server generates a random challenge that it sends to the end-user device.

Step 3: The end user is asked to hold his EMV card up to the mobile telephone or to insert it into the card reader (PC/laptop). Optionally, he can also be asked to enter a PIN and/or a password that he himself selected during the registration phase.

Step 4: The token server's challenge (step 2) is sent to the card. The card responds with a signature and/or cryptogram, depending on the card type and method employed (DDA, SDA, CDA). The challenge is included in the computation of the signature and/or the cryptogram. In addition to the signature and/or cryptogram, data read out from the card (e.g. PAN, card holder name, expiration date) and PIN/password are sent to the token server. Alternatively, a hash value over the PIN/password can be sent to the token server.

Step 5: According to one aspect of the present invention, the token server checks the signature or the cryptogram of the card for validity. Depending on the card type, this can be effected with publicly known keys (public keys) of the card network or by querying the card issuer in the case of card cryptograms based on symmetric keys. Alternatively, the symmetric keys could be deposited on the token server. In this case, the token server can check the cryptogram itself.

Step 6: After the card signature has been successfully checked, the token server derives the symmetric key (seed value) according to one aspect of the present invention for OTP/CVC production. For this purpose, both card data (e.g. PAN, card holder name, expiration date, card sequence number, . . . ) and PIN/password of the user are considered. In addition, a server-specific secret (e.g. a master key stored in an HSM) can be included. In addition, a specific identifier of the web service (relying party) can also be considered in the derivation (e.g. URL). In an exemplary embodiment, the hash value can be formed over the card data and user data and encrypted with the master key.

Any cryptographically secure one-way function that maps the initial data (card data, user data) unequivocally and in collision-resistant manner to the final value (symmetric secret) is generally suitable for derivation.

Step 7: From the secret seed value derived in step 6, the actual OTP or CVC value is now computed by the token server. The computation can be based on existing and known methods (e.g. OATH protocols such as T-OTP, H-OTP).

Alternatively, further data can also be included in the computation of the OTP. These can be, for example, transaction data (or their hash values), if a transaction-specific OTP is formed to authorize a transaction. These data have then previously been transmitted from the end user device to the token server.

In one embodiment, a challenge that was either transmitted by a server or entered by the user (e.g. for identification in telephone banking) are considered in the computation of the OTP value.

Alternatively, a time-limited random value can also be included in the computation of a CVC. This random value is produced by the token server or a further server and is valid for a predefined time interval. This value ensures that no future CVC values are predictable and that there is evidence that the card from which the CVC value is derived was actually available to the user at the time of the transaction. This prevents an attacker who does not physically have the card present from carrying out transactions with stolen credit card data. The produced CVC value can then be employed for an e-commerce transaction within the time interval ("card non-present transaction"). Typical time intervals are 1 minute, 10 minutes, 20 minutes, or 1 hour.

Step 8: The OTP/CVC value produced in step 7 is exported to the end user device via the, in particular secure, data connection. The value can then be displayed there or forwarded directly to a web service (verification server) for checking there.

Alternatively, the token server can export the OTP/CVC value directly to a web service via a predefined interface. For this purpose, according to one aspect of the present invention, the destination address must have previously been communicated to the token server by the end user device.

Since a symmetric secret is derived in this method, the web service that wants to check the OTP/CVC value must also have this secret in accordance with one aspect of the present invention. There are several alternatives with respect to this:

Alternative 1: Secure Export of the Seed Value:

In this alternative, a user registration is initially effected, during which the seed value is subsequently exported. The method is based on the following steps:

Step 1-6: According to one aspect of the present invention, these steps run analogously to the OTP/CVC generation phase. In step 3, the user can freely choose a PIN/password when registering. In step 4, the destination address of the web service to which the secret seed value is to be transmitted can optionally also be transmitted.

Step 7: The secret seed value is now exported to the corresponding web service. The web service needs the seed in order to be able to later check the OTP/CVC values on the server side. In contrast to the token server, which dynamically derives the seed value for every transaction, the web service must store the seed permanently and securely. This export can be effected via the end-user device, which then forwards the value to the web service, or directly by the token server to the web service.

The seed value should preferably be encrypted for export. For this purpose, the web service can transfer a certificate and a URL via the end user device. The token server then checks on the basis of a white list whether the web service in question is an authorized one. The seed value is encrypted and exported with the public key of the certificate.

Alternative 2: Check by Token Server

In this variant, the token server itself makes available the functionality to check the OTP/CVC value. For this purpose, it supplies the web service with a corresponding interface. The web service transmits the OTP/CVC value, which it received from the end user, to the token server. The token server has cached the user's seed value for the period of validity of the OTP/CVC value. In this validity interval, the web service can contact the token server and have the validity of the OTP/CVC value checked. After the validity interval has expired, the token server discards the seed value according to one aspect of the present invention.

Alternative 3: ID-Based Encryption

In this variant, the web service uses an "ID-based encryption" (IBE) scheme according to the state of the art. When registering, the end user transfers a URL or other specific identifier of the web service. The token server employs this identifier as a public key (according to the corresponding and known IBE scheme) and encrypts the seed value therewith. The encrypted seed value is either transferred to the end user device or directly to the web service.

The proposed method serves to provide a security key, as can be employed, for example, in a payment process. The security key can be held ready for a web service or a payment terminal. Authorization is then effected. The smart card is a credit card that has electronic components that make possible to carry out computing operations and/or to manage a data communication. A smart card typically comprises a computing unit, a memory unit and an induction coil. The induction coil serves for power supply and can additionally take over the function of an antenna with reference to the data communication. Alternatively, the power supply and communication can be carried out in contact-based manner.

The smart card is physically present and thus can act as a security token that the user always has with him. As is known, a smart card is a credit card of a correspondingly compact construction type that does not actually bother the user, and thus the user acceptance is not weakened. In particular, it is advantageous according to the invention that no further hardware components are employed. The token server can generally be made available as a server which is data-technically connected to the end device. The end device can in turn be a payment terminal or also a mobile telephone.

The preparatory method steps are carried out in such a manner that a so-called challenge message is produced, which is transmitted to the end device. A challenge message is a query message, which is typically followed by a response message or an answer message. According to this challenge message, information is queried from the smart card, which is in turn answered by the smart card by means of the response message.

Conventional methods such as the known TLS method can be used to set up the, in particular secured, data connection. The TLS method serves to secure data communication, in particular between the end device and the token server. The smart card is then communicatively coupled to the end device, i.e. this smart card is inserted into a card reading device or it communicates wirelessly with the end device.

The end device forwards the produced challenge message to the smart card, wherein further method steps can also be carried out. The PIN is included in the computation of the seed and accordingly of the OTP/CVC. If the PIN is incorrect, this is only discovered by the verification server. The PIN thus serves to authenticate the user vis-à-vis the verification server. For example, it can be provided that a password to be entered by the user or a PIN is additionally included in the computation of the secret key.

This is followed by the smart card generating a response message that is produced on the basis of stored computing operations in which the challenge is considered. For this purpose, the smart card can access the memory that has been written to, and the computing unit executes read or write operations. A cryptographic method can already be applied here and the security information can comprise data from the smart card. For this purpose, the smart card causes the secure information to be transmitted to the token server, which can be executed in such a manner that the smart card merely makes available the data or information and the actual data communication takes place between the end device and the token server. For example, the end device can be coupled to the Internet by means of wired communication, which establishes a connection to the token server. It is also possible here for the end device to communicate wirelessly by means of a router, which in turn is connected to the Internet. In the event that the end device is a mobile telephone, these interfaces can be employed and wireless communication takes place with corresponding network components that communicate with the token server.

Causing the transmission essentially describes here that the smart card does not have to set up the connection autonomously, but rather communicates to the end device that data are now to be transmitted. As a result, the actual data communication takes place via the data interface of the end device.

Since the security information of the smart card is now available to the token server, the token server can check this information. Corresponding control commands are stored on the token server and reference information is also stored, which makes it possible to carry out the check In this manner, data can be deposited on the token server that describe expected security information. If this expected security information is actually available, a positive check can take place. In contrast, if it is discovered that the security information does not meet the expectations, this may be an attack and an error routine is executed. An error routine advantageously provides that no security key is produced and the method is aborted.

In the case that the expected security information is checked positively, the token server carries out a production of a symmetric key in dependence on the transmitted security information. This production is typically based again on stored control commands and information on the token server. Here, the security information serves as an initial value that is entered into a corresponding cryptographic function. The cryptographic function processes the security information and derives a symmetric key from it. This cryptographic function can in turn be selected from a plurality of stored functions and can take into account the type of security information or the type of card type. Corresponding rules can be stored in a table, which indicates which security information is processed in which manner and, in addition, indicates which method is employed for checking, producing and further computing.

It is precisely this computation that is applied to the symmetric key and the result is the security key that is required, for example, to authorize a financial transaction. The security key is thus a password, a one-time password or a check number.

Finally, the computed security key is made available in such a manner that the verification server can verify the security key and thus the requested service or the transaction is released.

According to one aspect of the present invention, the security information comprises a signature and/or a cryptogram. This has the advantage that the security information can be easily made available by reading it from the smart card and the token server can also check the validity of the smart card. For this purpose, the token server can have control commands and information that describe the signature and, if necessary, decrypt it. The signature can then be checked. The card computes a cryptogram with a secret key over some data. The data and the cryptogram are transmitted from the card to the token server. The token server itself has to know the secret key; it computes a cryptogram itself over the data and compares this with the cryptogram sent along by the card. If the signature or the cryptogram cannot be evaluated positively, an error routine can be started in turn.

According to a further aspect of the present invention, data read out from the card, a PAN, a real name (for example of the card holder), an expiration date, a PIN, a password, a hash value, a card sequence number and/or a card type are transmitted in addition to the security information. This has the advantage that such card-specific data can be employed when producing the symmetric key. Further, user-specific values, such as a PIN, a password, can be employed. Transaction-specific values can also be considered in the further computation of the security code. Thus, further method steps with reference to the security information can relate to a wide variety of data and the security information is made available in such a comprehensive manner that different aspects can be mapped. For example, it can be evaluated whether the smart card is actually issued to a specific, expected user, wherein the real name of the card holder is read out. The expiration date of the smart card can be checked in an analogous manner and further data can be produced on the basis of such specific information. The symmetric keys can therefore be created in dependence on one or several data types. The above list can then act as an input for a function that produces the symmetric key.

According to a further aspect of the present invention, the check is effected in dependence on a card type of the smart card. This has the advantage that the security information can already make available the card type and thus it can be evaluated which security information is made available, and further method steps, such as producing a symmetric key or computing a security key in dependence on the present smart card type, can also be carried out.

According to a further aspect of the present invention, the security key is present as a check number, a password used once and/or a password. This has the advantage that the proposed method can replace or supplement known cryptographic methods and is suitable for producing a so-called CVC or a password. In particular, the password can be a so-called one-time password (OTP) or one-off password. A password used once is a so-called one-time password or one-way password. This will be canceled as soon as it has been employed. The security key can consequently serve, for example, to authorize a payment vis-à-vis a web service or a payment process.

According to a further aspect of the present invention, the production of the symmetric key comprises selecting keys stored on the token server. This has the advantage that different keys can already be present and thus the symmetric keys or the symmetric key merely has to be read out from the token server. Here, a database can be maintained that has the appropriate key. Symmetric keys are typically keys that are known to both entities, i.e. the entity that encrypts and likewise the entity that decrypts. In a preparatory method step, at least one symmetric key thus can be stored on the token server. According to a further aspect of the present invention, the production of the symmetric key comprises the employment of a token-server-specific key, which is included in the computation of the secret key and prevents the computation of the secret key from possibly being effected without knowledge of the token-server-specific key.

According to a further aspect of the present invention, the computation of the security key takes place in dependence on the produced symmetric key while employing a stored cryptographic function. This has the advantage that the computation of the security key can be carried out independently by the token server, and a cryptographic function can also be made available which uses the symmetric key as input in order to then compute the security key as output. Thus, the security key is computed in dependence on the produced symmetric key, wherein the dependency is given by a cryptographic function.

According to a further aspect of the present invention, the symmetric key acts as a start value in the computation of the security key. This has the advantage that cryptographic functions can also be employed that require a so-called seed value and this start value or seed value thus may be present as the symmetric key. This means that already implemented cryptographic functions can be re-employed.

According to a further aspect of the present invention, the symmetric key is produced on the basis of a stored cryptographic function. This has the advantage that even the symmetric key can be an output value of a cryptographic function which processes the security information as input. The cryptographic function for generating the symmetric key can be the same or similar functions as are employed with reference to the computation of the security key, and thus the token server can advantageously provide these cryptographic functions merely once.

According to a further aspect of the present invention, checking the transmitted security information comprises comparing the security information with stored reference values. This has the advantage that the check can be carried out independently by the token server, and thus the security information is merely checked in that, for example, an expected signature is checked, and if the security information is available in accordance with the stored reference values, a positive check takes place. As a result, another security mechanism is implemented. An alternative aspect is that the token server produces a new challenge randomly each time, and the EMV card includes the challenge in the signature. This results in a new signature each time, which thus cannot be compared with a reference value stored on the token server. Instead, the token server must verify the signature and take into account the challenge cached on the token server.

The reason for this method is that an attacker cannot observe an authentication and can then misuse the same data for an authentication (replay attack).

According to a further aspect of the present invention, a predetermined error routine is started in the event of a negative check. This has the advantage that it is possible to react to an attack or an error in different manners. Typically, the method can either be canceled or security mechanisms are executed. For example, the corresponding user can be blocked or further data communication can be prevented because an attack, i.e. unauthorized access, is expected.

According to a further aspect of the present invention, the end device communicates with the smart card in a contactless or contact-based manner. This has the advantage that conventional smart cards can be re-employed, and an end device can be in the form of a card reading device, for example, or a mobile telephone can also be made available as an end device. Contactless communication is preferably a so-called near field communication or communication between the smart card and the end device, which transmits data to a suitable smart card over short distances by means of inductive coupling.

According to a further aspect of the present invention, the end device is made available as a mobile telephone or a card reading device. This has the advantage that the proposed method can be integrated into existing infrastructures, and thus it is possible to implement the proposed method merely in terms of software, i.e. on the basis of control commands. This also saves technical effort.

The object is also achieved by a computing arrangement for making available a security key while employing a smart card as a security token and a token server, comprising an interface unit adapted to transmit a random challenge message produced by the token server via a secured data connection from the token server to an end device, the end device adapted to forward the produced challenge message from the end device to the smart card, which is adapted to cause at least one security information item to be transmitted as a response message to the token server via the, in particular secured, data connection, the token server adapted to check the transmitted security information and, if the check is positive, produce a symmetric key in dependence on the transmitted security information, a computing unit adapted to compute a security key in dependence on the produced symmetric key and a further interface unit adapted to make available the computed security key by means of the secured data connection from the token server to the end device.

The person skilled in the art recognizes that further components are provided, such as network components that manage the data communication. The computing unit can be integrated in the token server, which has interface units. Analog interface units are also present in the end device. For example, the end device can be a mobile end device, preferably a mobile telephone or also a laptop. Portable end devices of a cash register system are also advantageous here.

The object is also achieved by a computer program product with control commands which implement the method and/or operate the proposed computing arrangement.

The proposed method can be implemented as control commands in such a manner that a communication protocol is created. With reference to the proposed method, it is advantageous that the method steps are preferably executed exactly as they are claimed. Thus, individual method steps may be inferable from the prior art, wherein in particular the proposed sequence in its entirety leads to the advantage according to the invention. Thus, all method steps must also be taken account of in their entirety. This does not exclude that further method steps can be provided or substeps are employed.

Further, it is particularly advantageous according to the invention that the method is suitable for operating the computing arrangement or the computing arrangement is adapted to execute the method. The method thus comprises method steps which can be simulated as functional components of the computing arrangement. Structural features of the computing arrangement can also make available functionality which simulate the method steps.

BRIEF DESCRIPTION OF THE DRAWINGS

Further advantageous embodiments are explained in more detail with reference to the attached figures. The figures are described as follows.

DETAILED DESCRIPTION OF VARIOUS EMBODIMENTS

Figure 1:
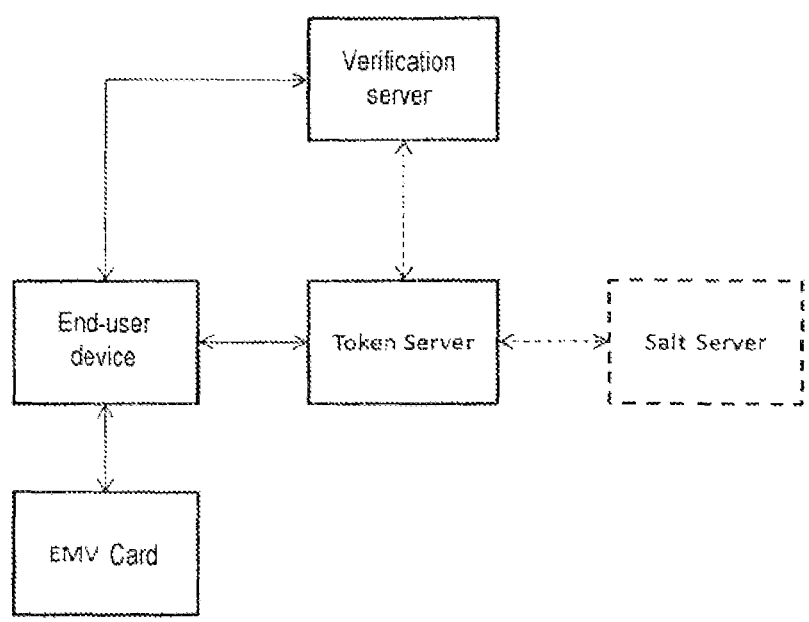
FIG. 1: a schematic communication flow of the components involved in the method according to the invention.

FIG. 1 shows an exemplary computing arrangement, wherein the end-user device, i.e. the end device, which communicates with a smart card is drawn on the left side. The smart card is shown here as an EMV card. In the middle of FIG. 1, the so-called token server is drawn, which communicates with further servers network-technically, for example with a verification server and a salt server.

Figure 2:
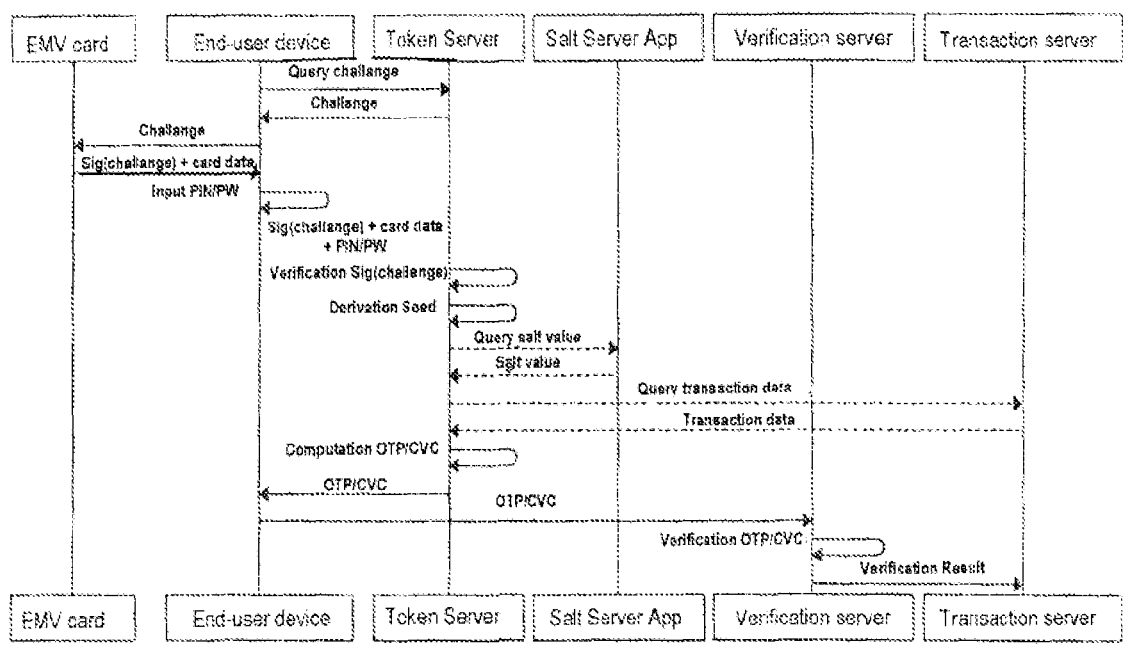
FIG. 2: a sequence diagram for generating a one-time password or a check number according to the proposed method.

FIG. 2 shows further advantageous components, such as a salt server app and a transaction server. The challenge-response method already described is shown here and the challenge message is transmitted, which is signed and then returned together with card data. A PIN or a password can be entered subsequently. The encrypted challenge or signed challenge with the card data and possibly the PIN and password is made available to the token server.

The signed challenge is verified in the token server and a seed or a start value is derived. This is followed by a communication with the salt server app, which is brought to execution on the salt server, for example. This is followed by a request for transaction data to the transaction server, which can also be referred to as a payment server, and then transmitted back to the token server in response to these requested transaction data. This is followed by a computation of the one-time password or the check number. The computed password or the check number is transmitted to the end-user device, which has these data, i.e. the computed security key, checked by the verification server. The result is then transmitted to the transaction server, and, if the verification is positive, the transaction can ultimately be executed.

Figure 3:
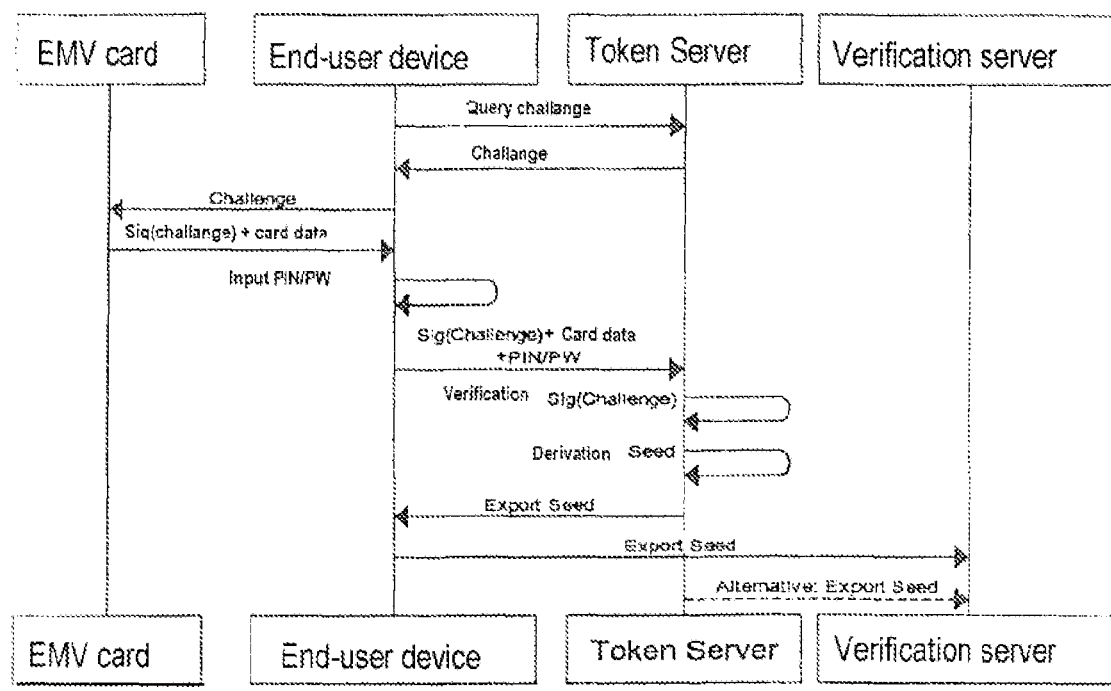
FIG. 3: a sequence diagram of a registration and a seed export according to a further aspect of the present invention.

Initially, FIG. 3 shows method steps that are similar to those stated in FIG. 2, for example. In addition, the derived start value or seed value is forwarded to the end-user device. This is referred to as exporting here. This seed can then be transmitted from the end-user device to the verification server and can then be employed in further computing steps.

Figure 4:
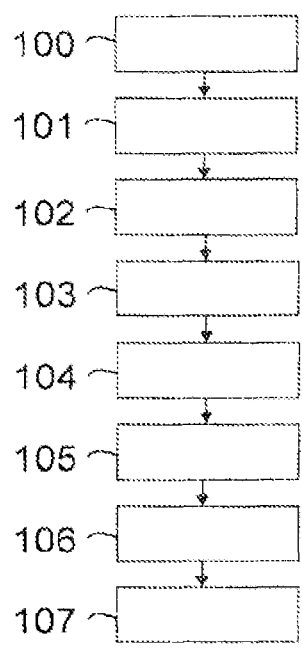
FIG. 4: a schematic flow diagram of the proposed method for making available a security key according to one aspect of the present invention.

FIG. 4 shows a method for making available a security key while employing a smart card as a security token and a token server, comprising transmitting 101 a random challenge message produced 100 by the token server via a secured data connection from the token server to an end device, forwarding 102 the produced 100 challenge message from the end device to the smart card, which causes a transmission 103 of at least one security information item as a response message to the token server via the secured data connection, a checking 104 of the transmitted 103 security information by the token server and, if the check 104 is positive, producing 105 a symmetric key in dependence on the transmitted 103 security information, computing 106 a security key in dependence on the produced 105 symmetric key and making available 107 the computed 106 security key by means of the secured en data connection from the token server to the end device. The security key can still be transmitted to the verification server and verified.

Personalized EMV cards that have already been issued can be employed as security tokens for OTP/CVC generation without the cards being originally able to do so. It is not necessary to modify the cards (no additional applets, no change to the card operating system, no larger memory requirements, no increase in the price of the cards).

The end user does not need to have with him an additional token or a special reading device (e.g. CAP reader); the issuer does not need to issue any new tokens according to one aspect of the present invention. A card base of >1 billion issued cards is immediately available as security tokens. Certain types of cards (DDA cards, partly CDA cards) can also be employed with this method without the involvement of the issuer.

Compared to the software method, there is a significantly higher level of security, since the OTP/CVC generation is linked to a hardware security element (EMV card). In connection with PIN/password, a real two-factor method results with the cryptographic security of the card. According to one aspect of the present invention, there is no need to store a secret seed value on a (potentially insecure) customer device. The token server involved does not need to store any user-specific data. Dynamically derived seed values are discarded immediately after the transaction. This means that there are no databases created with user data that could potentially be attacked.

The invention claimed is:

1. A method for making available a security key while employing a smart card as a security token and a token server, comprising:

transmitting a random challenge message produced by the token server via a data connection from the token server to an end device;

forwarding the produced challenge message from the end device to the smart card;

transmitting at least one security information item as a response message to the token server via the secured data connection;

checking the transmitted security information;

producing a symmetric key in dependence on the transmitted security information, if the check is positive;

computing a security key in dependence on the produced symmetric key; and making available the computed security key by means of the data connection from the token server to the end device;

wherein the computing of the security key is carried out in dependence on the produced symmetric key while employing a stored cryptographic function;

wherein when computing the security key, the symmetric key is determined as the start value.

2. The method according to claim 1, wherein the security information is transmitted as a signature and/or a cryptogram.

3. The method according to claim 1, wherein in addition to the security information data read out from the card, a PAN, a real name, an expiration date, a PIN, a password, a hash value, a card sequence number and/or a card type are transmitted.

4. The method according to claim 1, wherein the check is carried out in dependence on a card type of the smart card.

5. The method according to claim 1, wherein the security key is computed as a check number, a password used once and/or a password.

6. The method according to claim 1, wherein by the producing of the symmetric key there is comprised selecting at least one key stored on the token server.

7. The method according to claim 1, wherein the producing of the symmetric key is carried out on the basis of a stored cryptographic function.

8. The method according to claim 1, wherein by the checking of the transmitted security information there is comprised comparing the security information with stored reference values.

9. The method according to claim 1, wherein a predetermined error routine is started in the event of a negative check.

10. The method according to claim 1, wherein the end device communicates with the smart card in a contactless or contact-based manner.

11. The method according to claim 1, wherein the end device is made available as a mobile telephone or a card reading device.

12. A computing arrangement for making available a security key while employing a smart card as a security token and a token server, comprising:

an interface unit adapted to transmit a random challenge message produced by the token server via a data connection from the token server to an end device;

the end device adapted to forward the produced challenge message from the end device to the smart card, which is adapted to cause a transmission of at least one security information item as a response message to the token server via the data connection;

the token server adapted to check the transmitted security information and, if the check is positive, to produce a symmetric key in dependence on the transmitted security information;

a computing unit adapted to compute a security key in dependence on the produced symmetric key; and a further interface unit adapted to make available the computed security key by means of the data connection from the token server to the end device;

wherein the computing of the security key is carried out in dependence on the produced symmetric key while employing a stored cryptographic function;

wherein when computing the security key, the symmetric key is determined as the start value.

13. A computer program product with control commands which execute the method according to claim 1 when these are brought to execution on a computer.

\* \* \* \* \*